United States Patent

[11] 3,588,189

| [72] | Inventor | James C. Cumming<br>Pleasant Ridge, Mich. |
|---|---|---|
| [21] | Appl. No. | 830,620 |
| [22] | Filed | June 5, 1969 |
| [45] | Patented | June 28, 1971 |
| [73] | Assignee | North American Rockwell Corporation<br>Pittsburgh, Pa. |

[54] BRAKE CONTROL SYSTEM
1 Claim, 2 Drawing Figs.
[52] U.S. Cl. .................................................. 303/21F,
188/181A, 303/6R
[51] Int. Cl. ................................................... B60t 8/16,
B60t 13/68
[50] Field of Search .......................................... 303/21, 6,
61—63, 68—69; 188/181

[56] References Cited
UNITED STATES PATENTS

| 3,066,988 | 12/1962 | McRae | 303/21UX |
|---|---|---|---|
| 3,433,535 | 3/1969 | Horvath | 303/21 |
| 3,441,320 | 4/1969 | Flory | 303/21 |
| 3,467,444 | 9/1969 | Leiber | 303/21 |
| 3,480,335 | 11/1969 | Inada | 303/21 |

*Primary Examiner*—Duane A. Reger
*Assistant Examiner*—John J. McLaughlin
*Attorneys*—John R. Bronaugh, Floyd S. Levison, E. Dennis O'Connor and Richard A. Speer ABSTRACT: A brake control system for a vehicle which permits normal operation of all of the brakes under moderate braking loads, and, under heavier braking loads, detects minor and major tendencies of certain wheels to lock and constantly modulates the braking effort to maintain a condition of partial wheel slip while preventing wheel lock. The invention has particular application to a hydraulic brake system.

INVENTOR

JAMES C. CUMMING

BY Strauch Nolan Neale Nies + Kurz

ATTORNEYS 3,588,189

1

BRAKE CONTROL SYSTEM

RELATED APPLICATIONS

The subject invention is particularly adapted for use with portions of the control system disclosed and claimed in copending application Ser. No. 662,448 filed Aug. 27, 1967, now abandoned in view of continuation application Ser. No. 866,152 filed Oct. 10, 1969 also now abandoned in view of continuation application Ser. No. 41,765 filed June 4, 1970 for Brake System and owned by applicant's assignee.

BACKGROUND OF THE INVENTION

Wheel lock may increase the total stopping distance and invariably causes loss of directional stability and control. Rear wheel lock creates an oversteer condition which often results in a spin. Front wheel lock produces complete loss of steering control. In articulated commercial vehicles such as tractor-trailer combinations wheel lock creates severe jackknifing and usually results in loss of directional stability and control. Experience has shown that it is beyond the skill of even an experienced operator to apply the brakes in a manner to achieve optimum braking conditions in an emergency or panic stop situation. Under these conditions the operator almost invariably applied the brakes fully which is sufficient to lock all or some of the wheels.

Many prior attempts have been made to produce a brake control which automatically overrides the operator control and prevents wheel lock or eliminates wheel lock if it occurs.

One such prior system which has been tested and used with excellent results is disclosed in the aforesaid copending application Ser. No. 662,448.

This system includes means for detecting major and minor tendencies of certain of the wheels to lock and generating separate control signals when these conditions are detected. When a minor tendency toward wheel lock is detected special valves are actuated to prevent the application of further pressure of the wheel brakes to establish a so-called "hold mode" of operation. Upon detection of a major tendency of the wheels to lock, another valve is actuated which relieves the pressure at the brakes of the effected wheel. While the general control system disclosed in the prior application is of general application, nevertheless the specific embodiment disclosed can be incorporated only in an air brake system.

SUMMARY OF THE INVENTION

It is the principal purpose and object of the present invention to provide an improved brake control system for vehicles equipped with hydraulic brakes, the system permitting normal operation of the brakes except when the wheels tend to lock up. When a tendency toward wheel lock up is detected the hydraulic pressure at the brakes associated with the wheel at which incipient wheel lock is detected is immediately reduced to permit the wheel to resume speed. As the wheel regains speed and approaches a zero slip condition the braking effort is automatically increased to maintain partial wheel slip while preventing wheel lock. The control system continues to modulate the braking effort to maintain optimum braking conditions until the brakes are released.

It is an additional object to provide improved hydraulic brake systems which have the foregoing performance advantages and which employ relatively uncomplicated mechanical structure which is of low cost construction and which affords an unusually high degree of reliability.

Additional objects and advantages of the invention will become apparent as the description proceeds in connection with the drawings described below.

THE DRAWINGS

FIG. 1 is a schematic illustration of an improved brake control system constructed in accordance with the present invention particularly adapted for installation on a four wheel vehicle equipped with hydraulic brakes; and FIG. 2 is a central vertical section through the valve assembly which is effective to modulate the pressure in the brake cylinders of one or more of the vehicle wheels.

DESCRIPTION OF PREFERRED EMBODIMENT

Figure 1:
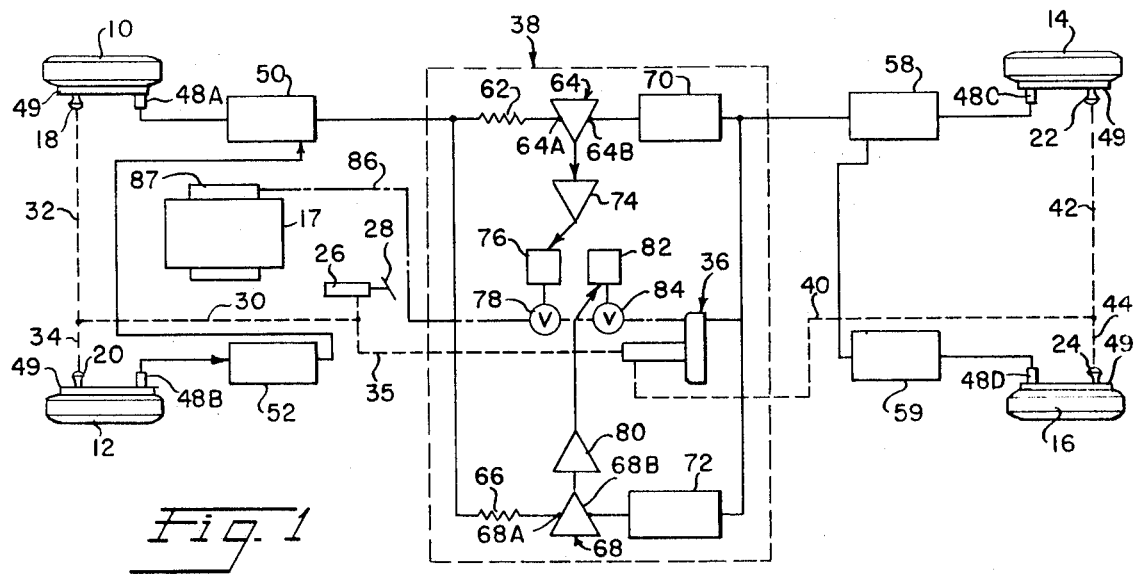

FIG. 1 illustrates the application of the brake control system of the present invention to a passenger vehicle or light truck having front wheels 10 and 12 and rear wheels 14 and 16 the latter being driven by an engine shown generally at 17. The wheels 10—16 are equipped, respectively, with conventional hydraulic brake mechanisms 18, 20, 22 and 24. The brake system includes the usual master cylinder 26 operated by a foot pedal 28. When the pedal 28 is depressed hydraulic fluid under pressure is delivered to the front wheels through a conduit 30 and branch conduits 32 and 34. Fluid under pressure is delivered to the rear wheels through conduit 35 connected to one side of a regulator assembly 36 included in the electromechanical control unit 38, thence to a brake line 40 and branch lines 42 and 44 leading to the rear brake cylinders 22 and 24, respectively. Under normal moderate braking conditions, the control unit 38 and the regulator 36 have no effect on the system and the pressure developed in the master cylinder 26 is delivered without modification to all of the wheel brakes.

The control unit 38 for modifying the operation of the rear wheel brakes includes an electronic system for generating a first signal when a minor tendency of the rear wheels to lock is detected and generating a second signal when a major tendency of the rear wheels to lock is detected, and a mechanical system including the regulator 36 for modifying the pressure at the rear wheel brake cylinders in response to the first and second signals.

The electronic portion of the control system may be the same as that disclosed in the aforesaid Ser. No. 662,448 to which reference may be had for details of construction. In general the control system includes electromagnetic pickup transducers 48A, 48B, 48C, and 48D associated with each of the vehicle wheels to detect the rotational velocity of the wheels. The transducers each have a permanent magnetic core pole piece facing the associated wheel brake drum which is provided with a series of circumferentially uniformly spaced magnetic elements 49. As the discontinuous magnetic field presented by the drum face rotates in the field of the pole piece to vary the flux density a signal is generated, the frequency and pulse width of which are directly proportional to the rotary velocity of the wheel.

The front wheel transducers 48A and 48B are connected, respectively, to combination rectifier and filter networks 50 and 52 which produce at their outputs two continuous direct current voltages proportional in amplitude, respectively, to the rotational velocities of the front wheels 10 and 12. The units 50 and 52 are connected in such a manner that the voltage output of the unit 52 is added to that of the unit 50. The rear wheel transducers 48C and 48D are similarly connected to the rectifier and filter networks 58 and 59 which again are additively connected together. The combined output signal of the two front wheel transducers 48A and 48B is delivered through an isolation resistor 62 to tap 64A of a differential comparator 64 and through an isolation resistor 66 to tap 68A of a comparator 68.

The combined voltage output of the units 58 and 59, which is indicative of the average rear wheel velocity, is fed to tap 64B of the comparator 64 through a variable attenuator 70 and to tap 68B of the comparator 68 through a variable attenuator 72. The two attenuators are, in effect, voltage dividers, being capable of manual variation to determine the magnitude of the voltage drop appearing across the associated comparator. The comparator 64 produces a specific control signal only when the voltage level at the terminal 64B is less than that at terminal 64A by a predetermined amount. Similarly, the second comparator 68 will generate a direct current voltage output signal when the voltage impressed on the terminal 68B is more negative than the voltage impressed on the terminal 68A by a predetermined amount.

The output signal of the comparator 64 triggers a power amplifier 74 to energize a solenoid 76 to close a normally open air valve 78. Similarly, the output of the comparator 68 triggers an amplifier 80 to energize a solenoid 82 to actuate an air valve 84. The valves 78 and 84 are positioned in series in a conduit 86 connecting the engine intake manifold 87 to the regulator 36 to control the action of the later as explained below.

As explained in greater detail in the aforesaid copending application Ser. No. 662,448, when all vehicle wheels are traveling at essentially the same speed the output of the comparators 64 and 68 is insufficient to trigger the amplifiers 74 and 80 and the valves 78 and 84 will remain closed. When, however, the rotational velocity of the rear wheels becomes slightly less than the rotational velocity of the front wheels (indicating incipient rear wheel lock) the comparator 64 generates a signal sufficient to trigger the amplifier 74 and energize the solenoid 76 of the valve 78. Since the attenuator 70 is adjusted so that its output is more negative than that of the attenuator 72, the output of the comparator 68 will remain low under these conditions. If the velocity of the rear wheels is further decreased with respect to the velocity of the front wheels indicating a major tendency toward rear wheel lock the voltage differential across the terminals 68A and 68B of the second comparator will also reach a sufficient value to trigger the amplifier 80 and actuate the solenoid 82 of the second valve 84.

Figure 2:
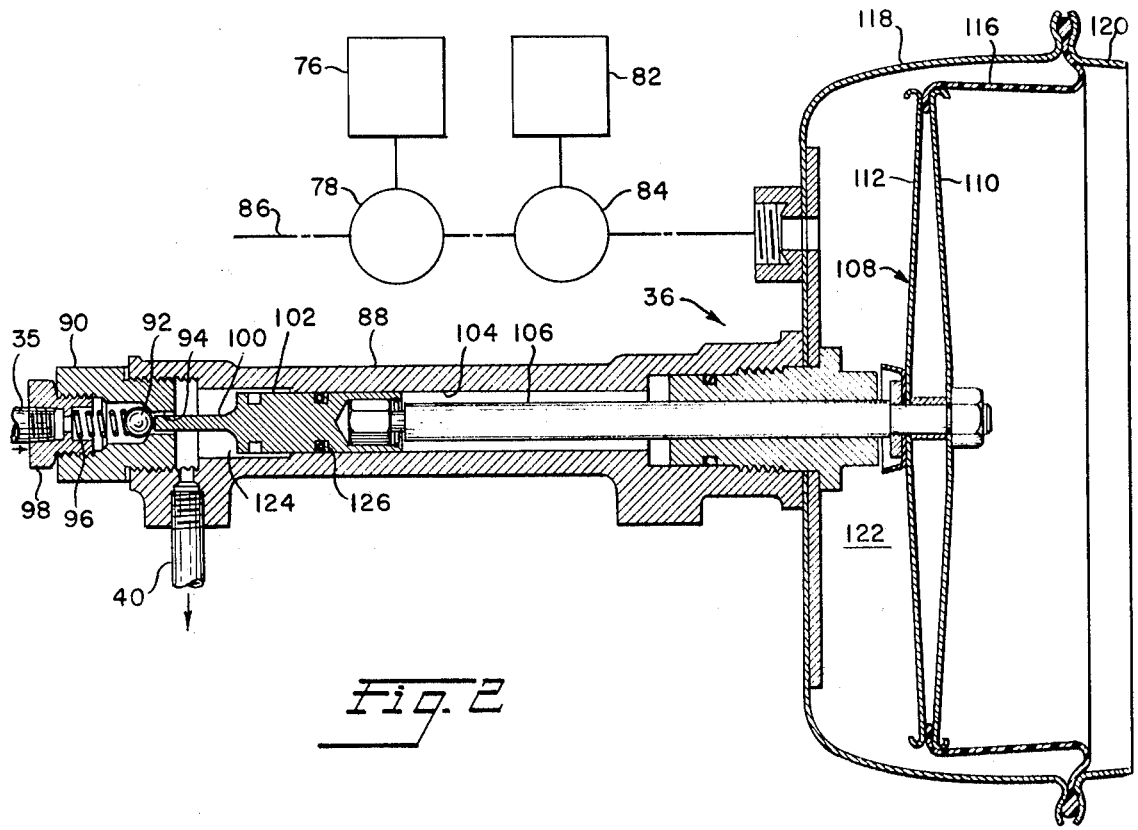

The regulator assembly 36, the action of which is controlled by the valves 78 and 84, will now be described with particular reference to FIG. 2. The regulator assembly comprises an elongated hollow valve body 88, one end of which carries a fitting 90 containing a check valve 92. The valve 92 is urged toward a position to close the valve port 94 by a spring 96 compressed between the ball 92 and a check valve body member 98 carried by the fitting 90 and connected to the brake line 35. The position of the valve 92 is also controlled by the stem 100 of a piston 102 slidably received in a through bore 104 in the main regulator body 88.

The piston 102 is carried by a rod 106 connected at its opposite end to a diaphragm assembly 108 which comprises a pair of rigid plates 110 and 112 suitably connected to the lower end of the rod 106 and a resilient diaphragm member 116, the inner periphery of which is clamped between the plates 110 and 112 and the outer periphery of which is clamped between a housing member 118 and an annular retainer 120. The diaphragm assembly and housing 118 form a closed chamber 122 connected to the engine intake manifold line 86 through valves 78 and 84. The opposite or outer side of the diaphragm assembly is open to atmospheric pressure.

When the solenoids 76 and 82 are deenergized during normal operation of the vehicle the valves 78 and 84 connect the diaphragm chamber 122 to the engine intake manifold. Under these conditions the diaphragm assembly, the rod, and the piston 102 will be displaced to the left as viewed in FIG. 2 and the stem 100 projects through the port 94 to maintain the ball 92 away from its seat to permit free flow of brake fluid from the line 35 to the line 40. The area of the diaphragm assembly 108 and the pressure differential across it is sufficient to maintain the ball 92 away from its seat during normal brake application. When the solenoid 76 is energized the valve 78 will be closed to isolate the diaphragm chamber from the intake manifold. This produces no change in the position of the components of the regulator 36. When the solenoid 82 is energized the valve 84 is shifted to connect the diaphragm chamber to atmosphere thus reducing the pressure differential across the diaphragm and permitting the piston 102 to move to the right as viewed in FIG. 2 permitting the ball 92 to seat and isolating the rear wheel brake cylinders from the master cylinder. At this time the rear wheel brake cylinders are effectively connected to a variable capacity chamber 124 formed by the fitting 90, the ball 92 the main regulator body 88 and piston 102 which is sealed at 126.

The overall operation of the brake system will now be considered in greater detail assuming first that the vehicle is proceeding normally without the application of brakes. Under these conditions the output of the comparators 64 and 68 is low the valves 78 and 84 are in their "off" position. The diaphragm chamber 122 is connected to the engine intake manifold and the diaphragm and the associated movable components of the regulator 36 are displaced to a limit position to the left as viewed in FIG. 2. Normal acceleration or deceleration of the vehicle, including moderate braking under normal conditions, will produce no change in the system and all brakes operate in the normal manner.

If, however, the braking effort reaches a level which is sufficient to produce a tendency of the rear wheels to lock under the existing traction conditions the output of the comparator 64 will be high resulting in displacement of the valve 78 to its "on" position isolating the diaphragm chamber 122 from the intake manifold 87. This produces no change in the braking action. If the level of braking effort is sufficiently high to produce a more marked tendency of the wheels to lock, the comparator 68 becomes effective to energize solenoid 82 and shift valve 84 to its "on" position thus connecting the diaphragm chamber 122 to atmosphere resulting in displacement of the diaphragm 108 and all the associated movable components to the right as viewed in FIG. 2 under the influence of hydraulic pressure acting on the left end of the piston 102.

The valve 92 will close immediately preventing the application of further pressure to the rear wheel brake cylinders. The piston 102 will continue to move because of the pressure existing in the rear wheel brake cylinders until this pressure is reduced sufficiently to eliminate the excessive rear wheel slip. When the brakes are then partially released the speed of the rear wheels will increase thus deenergizing comparator 68 permitting the valve 84 to move to its normal "off" position thus isolating the chamber 122 from the atmosphere and from the engine intake manifold. A static pressure level is thus created within the chambers 122 and 124 and establishing the pressure of a hydraulic fluid at rear brake cylinders at a fixed level sufficient to cause partial and acceptable rear wheel slip while preventing rear wheel lock.

The response time of the system to the detected tendency toward rear wheel lock up is very short, for example, small fraction of a second. Thus this system immediately produces the desired braking action for the conditions existing at the instant of actuation of the valves 78 and 84. However the conditions which control the amount of wheel slip vary constantly. For example, the forward dynamic weight shift which occurs during braking and the coefficient of friction between the vehicle tires and the road surface constantly vary during a given brake application.

The system continues to monitor the amount of wheel slip and modulate the braking action in such a manner as to establish a level of braking effort to assure minimum stopping distance without wheel lockup. For example, if vessel slip becomes excessive the comparator 68 will again shift the valve 84 to connect the chamber 122 to atmosphere to permit reduction in the pressure at the rear wheel brake cylinders, the action continuing until the excessive slip is eliminated at which time the valve 84 is again shifted to its off position thus again stabilizing the system.

If, on the other hand, the pressure in the rear brake cylinders is reduced sufficiently so that all tendency of the rear wheels to slip is eliminated the comparator 64 will be deenergized restoring the valve 78 to its off position decreasing the pressure in chamber 122 to displace the diaphragm and associated components to the left increasing the pressure in the chamber 124 and correspondingly increasing the pressure in the rear brake cylinders. This action continues until the desired partial slip is restored at the rear wheels at which time the valve 78 is again shifted to again stabilize the system.

Thus it will be apparent that the level of braking effort at the rear wheels is constantly shifted during vigorous braking action to maintain the rear wheels in a condition of partial slip but to avoid wheel lock. The initial brake application is sufficiently high to produce a tendency toward lock up at the rear wheels which is the desired braking condition. The optimum braking force is thereafter maintained until the brakes are released, by automatically increasing or decreasing the actual braking force in accordance with the constantly changing dynamic conditions. The level of braking effort never departs significantly from that which is regarded as optimum. The brakes are never released nor pulsed. Thus under all conditions near peak braking efficiency is maintained, stopping distances are held close to their practical minimums, and full directional stability of the vehicle is maintained.

As in the system disclosed in the aforesaid copending application Ser. No. 662,448, there is one instance in which the rear wheels will be allowed to lock, i.e., when the front wheels lock first. This situation will occur only in the most infrequent panic stop situations in which the matter of bringing the vehicle to a complete stop in the shortest possible distance is more important than permitting the driver to retain steering control. While the four wheel lock up may result in skidding the vehicle will travel in an essentially straight line.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Pat. is:

I claim:

1. In a vehicle brake system in which hydraulic fluid is normally supplied from a pressure source to the brakes for front and rear vehicle wheel sets under operator control, means to modify the operator-controlled fluid pressure supplied to the brakes of at least one of said wheel sets comprising means providing a variable capacity chamber in the brake line connecting said pressure source to the brakes of said one wheel set, the pressure supplied to said last-mentioned brakes varying inversely with the size of said chamber, a piston forming a wall of said chamber and being movable in opposite directions to increase or decrease the size of said chamber, a fluid pressure responsive actuator for said piston, one surface of said fluid pressure responsive actuator being exposed to atmospheric pressure, means forming a control chamber at the opposite side of said actuator, a conduit adapted to connect the control chamber to a source of subatmospheric pressure, a normally open valve in said conduit adapted, when actuated, to close said conduit, means responsive to a first condition of limited partial slip at one said wheel to actuate said first valve, a second valve adapted, when actuated, to connect said control chamber to atmosphere, and means responsive to a second and greater condition of partial slip at said one wheel for actuating said second valve.